United States Patent [19]

Friedman

[11] 4,016,578

[45] Apr. 5, 1977

[54] PROCESSING FLUID FLOW CONTROL DEVICE FOR SELF DEVELOPING CAMERA

[75] Inventor: Harvey S. Friedman, Natick, Mass.

[73] Assignee: Polaroid Corporation, Cambridge, Mass.

[22] Filed: Jan. 13, 1976

[21] Appl. No.: 648,672

[52] U.S. Cl. .................................. 354/86; 354/304
[51] Int. Cl.² ....................................... G03B 17/50
[58] Field of Search .............. 354/86, 85, 180, 301, 354/304

[56] References Cited

UNITED STATES PATENTS

| | | | |
|---|---|---|---|
| 2,991,703 | 7/1961 | Eloranta | 354/304 |
| 3,416,427 | 12/1968 | Murphy | 354/304 |
| 3,590,708 | 7/1971 | Finelli | 354/304 |
| 3,779,770 | 12/1973 | Alston et al. | 354/86 X |
| 3,810,211 | 5/1974 | Wareham et al. | 354/86 |
| 3,820,137 | 6/1974 | Driscoll | 354/86 |
| 3,832,731 | 8/1974 | Kinsman | 354/304 |
| 3,925,800 | 12/1975 | Whall | 354/301 |
| 3,948,662 | 4/1976 | Alston et al. | 354/304 X |

Primary Examiner—Richard L. Moses
Attorney, Agent, or Firm—Francis J. Caufield

[57] ABSTRACT

Photographic apparatus for consecutively transporting and processing a cassette of self-processable film units. The apparatus includes an integrally molded plastic housing section having a film exit slot, a pair of rotatable pressure-applying rollers mounted therewith, and a specially contoured camming surface positioned intermediate the rollers and the exit slot to intercept a film unit as it emerges from the rollers and bend it toward the exit slot as it is being advanced to the exterior of the apparatus. The location of the camming surface and its contour are specially chosen to provide the film unit with a complex curvature after it emerges from the rollers to influence the distribution of a processing fluid being spread within it as it is advanced to the exterior of the apparatus.

20 Claims, 14 Drawing Figures

PROCESSING FLUID FLOW CONTROL DEVICE FOR SELF DEVELOPING CAMERA

BACKGROUND OF THE INVENTION

1. Field of the Invention

The present invention relates to the field of photography and, more specifically, to a photographic apparatus having structure for influencing the thickness distribution of a processing fluid spread across preselected portions of an integral negative-positive self-processable type film unit.

2. Description of the Prior Art

An important step in the processing of a self-processable film unit is to spread a processing fluid between a predetermined pair of adjacent layers of the film unit, subsequent to its exposure, in order to initiate a diffusion transfer process which develops the photoexposed image. In order to produce a quality final image, the thickness of the fluid must be distributed over the entire photoexposed area of the film unit in a substantially uniform manner.

The present invention relates to controlling the distribution of a processing fluid within an integral negative-positive self-processable type film unit, representative examples of which are disclosed in U.S. Pat. No. 3,415,644 and U.S. Pat. No. 3,594,165.

Basically, these integral film units are multilayer structures having a rupturable container, holding a processing fluid at a leading end thereof and a trap for collecting excess fluid at the trailing end. The multilayer structure includes a pair of outer support sheets, at least one being transparent, and a plurality of layers including photosensitive and image receiving layers sandwiched between the outer support sheets which are bound together along lateral edges thereof.

Subsequent to exposure of the photosensitive layer or layers through the outer transparent sheet, the film unit is advanced, leading end first, between a pair of pressure applying members for applying a compressive pressure progressively along the length of the film unit to rupture the container discharging the fluid between a predetermined pair of adjacent layers, and then to distribute the fluid.

Because the layers are bound together along the lateral edges thereof, there is more resistance to fluid flow adjacent these edges than in the center portion of the film unit. Consequently, the discharged mass of fluid tends to advance rearwardly along a tongue-shaped wavefronts with a greater concentration of fluid in the center than out at the lateral edges.

In order to compensate for the initial uneven distribution of fluid, it has been found to be advantageous to selectively apply a second compressive pressure to the central portion of the film unit in the path of the rearwardly advancing wavefront. This second compressive pressure has a secondary thinning effect at the center of the film unit thereby making more fluid available for use elsewhere. It is reasoned that this pressure may force part of the fluid away from the center toward the lateral edges.

U.S. Pat. No. 3,779,770 disclosed a film container having integrally formed distribution control surfaces or projections thereon for selectively applying the second compressive pressure to the film unit as it is advanced through a film withdrawal slot in the container to the pressure applying members. Also, reference may be had to U.S. Pat. No. 3,820,137 which discloses a self-developing camera having structure for engaging and deflecting a thin wall portion of the film container having the distribution members formed therewith for positively urging the control members into engagement with the center portion of a film unit being advanced through the film withdrawal slot.

The integral self-processable film units generally have an inherent stiffness and as a film unit progressively advances from the exit side of the pressure-applying members, in cantilever fashion, it tends to follow a natural and substantially planar path of travel which is defined by the inherent stiffness. It has been discovered that deflecting the film unit from the natural path of travel by inducing a gentle and large radius bend in it on the exit side of the pressure-applying members beneficially influences the uniformity of the thickness distribution of fluid within the film unit.

While it is well established that the uniformity of fluid thickness distribution can be influenced by bending it immediately after it has emerged from the pressure-applying members, the mechanisms which produce this effect are not well defined at the present time and depend, in general, on complex factors related to hardware-film interactions.

A self-developing camera having structure for inducing a bend in the film unit as it emerges from the pressure-applying members is disclosed in U.S. Pat. No. 3,810,211 issued to R. R. Wareham on May 7, 1974. The camera is of the compact, folding, single lens reflex type and includes a housing section which extends forwardly of a pair of pressure-applying members. A combination film bending or deflecting plate and light shielding member is mounted near the forward end of the housing section adjacent a film exit slot therein that is offset with respect to the natural or normal emerging path of travel of the film unit. The plate is mounted for movement between a folded position and an extended position wherein it is disposed in the emerging path of travel to intercept the emerging film unit, bending it to induce a curvature in it and guiding it to the film exit slot. The disclosed housing section is characterized by its conventional construction using a plurality of piece parts that must be sequentially assembled and adjusted to define the film exit slot and mount the deflecting plate in predetermined relationship with respect to the pressure applying members and exit slot.

Camera structure having a similar purpose is disclosed in copending U.S. application Ser. No. 554,780 filed Mar. 3, 1975, in the name of A. S. Ivester. Here a self-developing camera is disclosed having an integrally molded plastic housing section that includes an offset exit slot and a camming member for deflecting a film unit towards the exit slot, as it emerges from a pair of pressure applying members, to influence the distribution of a fluid processing composition being spread within the film unit. However, even though the foregoing disclosures teach how to thin out the thickness of the processing fluid in the central portions of the film unit, using either pre-roller or post-roller structure for applying a secondary pressure, the control of the thickness of the processing fluid along the lateral edges of these integral type film units is an ever present concern. For example, incomplete corner coverage of the picture area at the trailing end of the film unit is a particularly troublesome problem especially when the camera is being used at depressed temperatures where the viscosity of the processing fluid increases. This makes the fluid even more prone to adhere to the lateral margins thereby depleting its supply in this area before reaching the trailing end corners. It is therefore desirable not only to have the capability of thinning out the fluid thickness near the central portion of the film unit by causing it to migrate laterally but also to more effectively control its thickness once the laterally displaced fluid migrates toward the lateral margins of the film unit.

Consequently, the present invention is directed toward providing structure for controlling the fluid thickness in regions adjacent the lateral margins of the film unit.

SUMMARY OF THE INVENTION

The present invention provides a photographic apparatus for use with integral self-processable type film units. The apparatus includes improved structure for enhancing the uniformity of the thickness distribution of a processing fluid within the film unit by inducing a complex curvature in that portion of the film unit emerging from a pair of pressure applying rollers.

More specifically, the apparatus is provided with an integrally molded plastic housing section having a film exit slot that is offset with respect to the normal emerging path of travel of the film unit; a camming surface for deflecting the film unit to induce the complex curvature and for guiding the film to the offset film exit slot; and integrally molded positioning structure which cooperates with a bracket mounting the pressure-applying rollers for accurately positioning the housing section, and thereby the integrally molded exit slot and camming surface, with respect to the film exit side of the pressure-applying rollers. Because the housing section is molded in one piece and includes integrally formed positioning structure, significant manufacturing cost reductions may be realized over the more conventional structure disclosed in the aforementioned U.S. Pat. No. 3,810,211.

Copending applications, Ser. Nos. 466,371 and 466,414 filed on May 20, 1974 disclose a self-developing camera having an extensible and retractable light shield mounted in alignment with the film exit slot. The shield is normally retracted and is extended outwardly from the exit slot to shield that portion of the film unit that extends outside the camera housing before the trailing end of the film unit has passed between the pressure applying rollers. The shield is preferably a self-retracting coil of opaque resilient material. In a preferred embodiment of the present invention, the molded plastic housing section also includes an integrally molded member that serves as a stop to locate the coil in its retracted position and cooperates with the retracted coil to form a light shield for the film exit slot.

Therefore, it is a primary object of the present invention to provide a photographic apparatus having a housing that is formed in part by a low cost housing section of molded plastic construction and having integrally molded therewith a film exit slot, a film camming surface for deflecting the film unit and guiding it toward the slot in induce a complex curvature in the film unit for the purpose of controlling the thickness distribution of the processing fluid especially along its lateral edges.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

In its preferred embodiment, the present invention is depicted as an integrally molded plastic housing section which forms part of a film transport and processing subsystem of a virtually automatic camera that utilizes the so-called integral negative-positive type self-processable film unit.

The invention is directed to particular structural details of the housing section which produce a complex curvature in the film unit as it is being advanced to the exterior of the camera. The complex curvature induced thereby influences the thickness distribution of a processing fluid that is spread across preselected portions of the film unit to effect a diffusion transfer process.

Inasmuch as an understanding of the invention depends on being familiar with the nature of the film unit, a camera in which it may be incorporated, and the operations of the camera, information relating to these aspects will first be furnished but only to the extent that it provides a back ground for explaining the invention.

Figure 1:
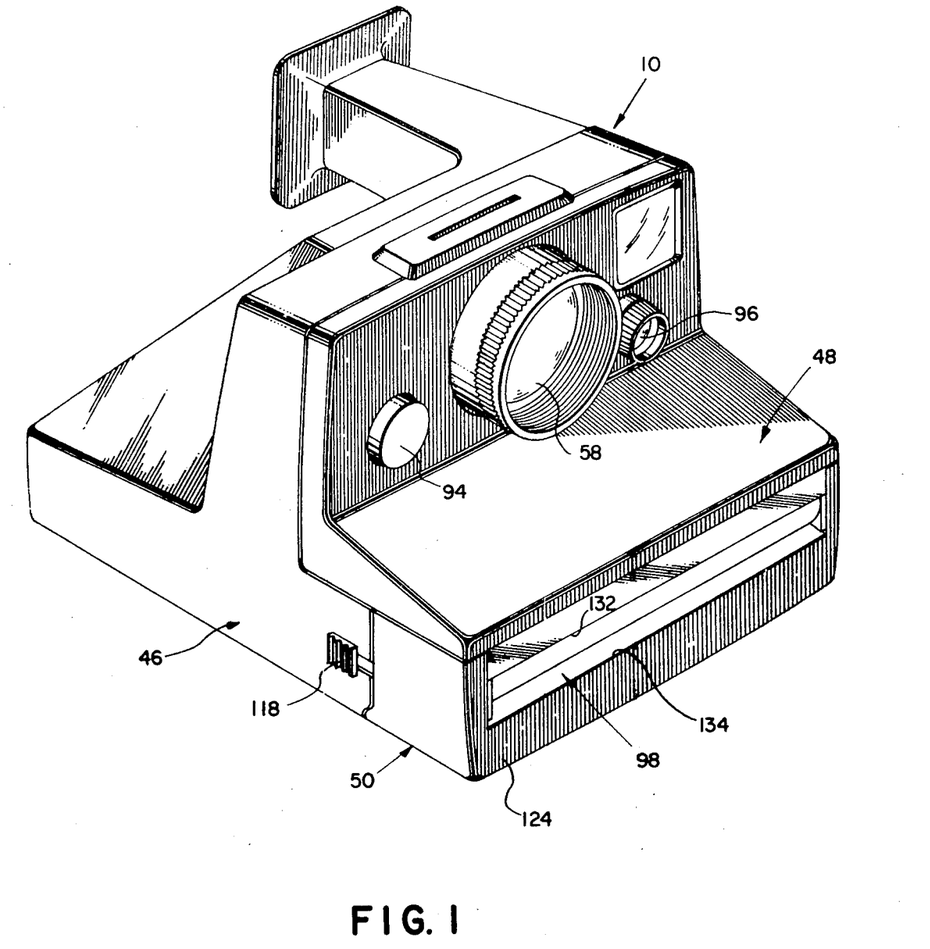
FIG. 1 is a perspective view of a compact, modular, nonfolding camera embodying the present invention.
Figure 3:
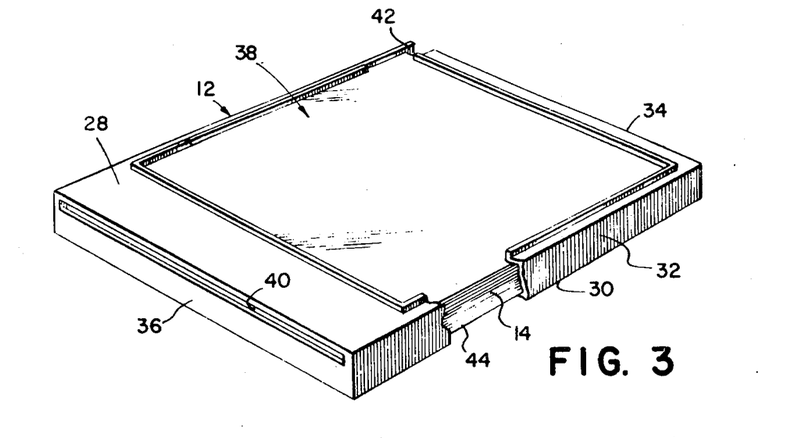
FIG. 3 is a perspective view, partly in section, of a film container, holding a plurality of self-processable film units therein, that is adapted to be located at an operative position in the base of the camera shown in FIG. 1.

Consequently, reference is now made to FIGS. 1 and 3 which illustrate, respectively, a camera 10 that is adapted to receive a film cassette 12 holding a plurality of stacked self-processable film units 14.

Figures 7, 8, 9:
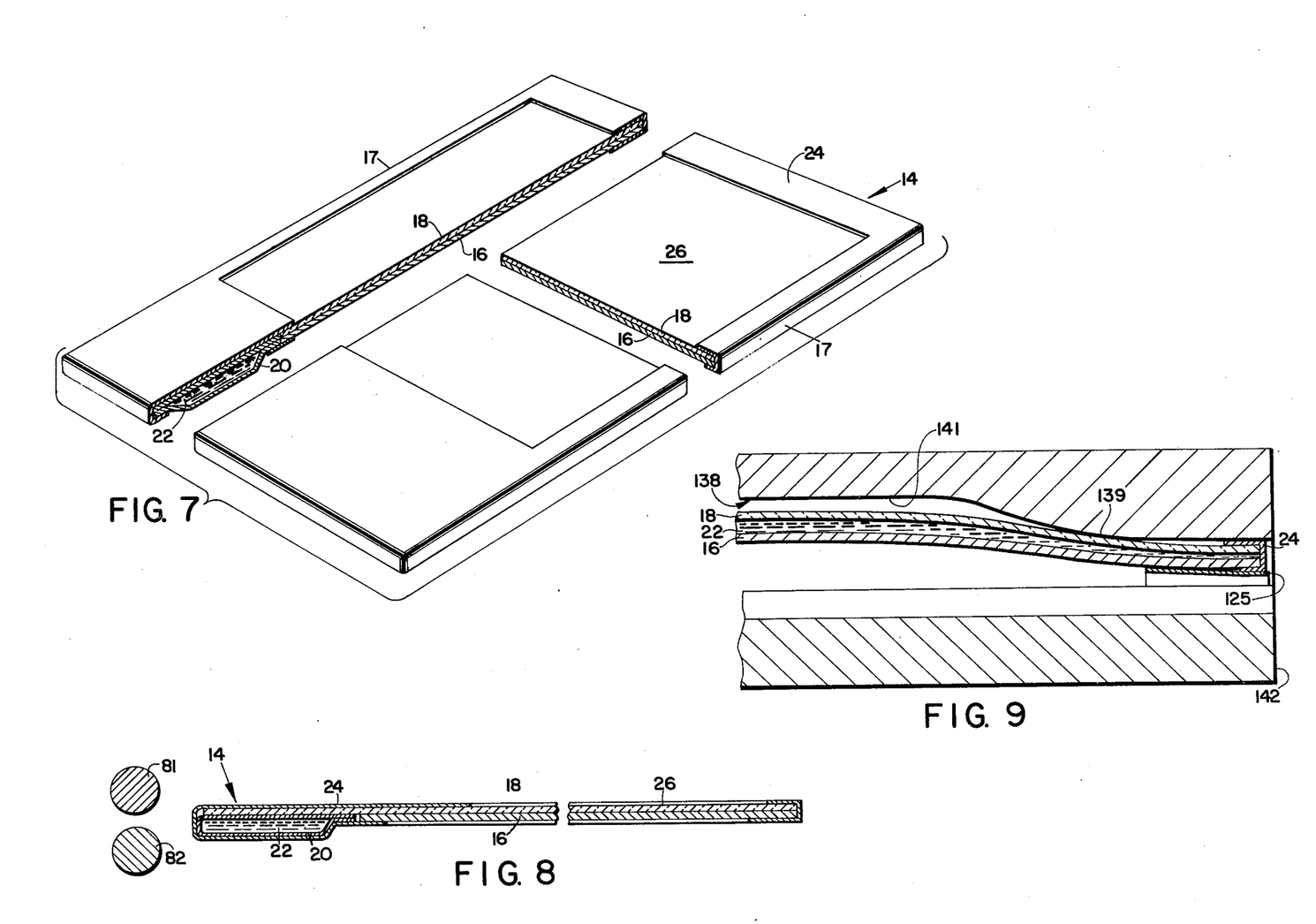
FIG. 7 is an exploded perspective view of a self-processable film unit that is held in the film container shown in FIG. 3.
FIG. 8 is a diagrammatic sectional view of the film unit shown in FIG. 7.
FIG. 9 is a section taken along line 2—2 of FIG. 5.

The self-processable film unit 14 is of the integral "nonpeel apart" type and is best shown in FIGS. 7 and 8 of the drawings. Basically, it is a multilayer structure or laminate which is diagrammatically illustrated in FIG. 8 as including a bottom sheet-like element 16 and a superposed top sheet-like element 18. Attached to the leading end of element 18 is a rupturable container 20 holding a supply of processing fluid 22 therein.

In actuality, the multilayer structure includes an opaque bottom support sheet, a top transparent support sheet, and a plurality of layers sandwiched therebetween and including one or more photosensitive layers and one or more image-receiving layers. The laminate is bound along its lateral edges by a binding element 24 which also defines the bounds of a generally square or rectangular image-forming area 26 on the top transparent support sheet through which actinic radiation is transmitted to expose the photosensitive layer or layers. Subsequent to exposure, the film unit is progressively advanced between a pair of pressure-applying members or rollers which discharge the fluid 22 between a predetermined pair of adjacent layers within the multilayer structure. In this connection, the binding element 24 in combination with the sheets, 16 and 18, define a pair of spaced apart longitudinally extending edge portions 17 that serve to space the rollers apart when the film unit 14 is advanced between them. In FIG. 8 of the drawings, the fluid 22 is spread between elements 16 and 18 which are intended to show the interface between the predetermined pair of adjacent layers. In reality, element 18 includes the top transparent support sheet and certain chemical layers and element 16 includes the bottom support sheet and certain other chemical layers.

For a more detailed description of film unit 14, reference may be had to U.S. Pat. No. 3,415,644 issued to E. H. Land on Dec. 10, 1968.

Referring to FIG. 3, the film container 12 is generally a box-like structure, preferably of molded plastic construction, and includes a forward wall 28, a rear wall 30, and a peripheral section joining walls 28 and 30 and including a pair of lateral side walls 32, a trailing end wall 34 and a leading end wall 36. Forward wall 28 has a square or rectangular exposure aperture 38 therein which is substantially coextensive with the image-forming area 26 of the film unit 14.

The film unit 14 are arranged in stacked relation within the film container 12 such that the forwardmost film unit bears against the interior surface of forward wall 28 and is located in position for exposure through the exposure aperture 38. Subsequent to exposure, the forwardmost film unit 14 is adapted to be advanced from film container 12 through an elongated film exit slot 40 in forward wall 36. As will be described later, the camera 10 includes a film advancing mechanism which is adapted to extend through an opening 42 near a trailing end corner of film container 12 for engaging and advancing an exposed forwardmost film unit through film exit slot 40.

The stack of film units 14 is spring biased toward the interior surface of forward wall 28 by a spring platen 41 (See FIG. 4) and, preferably, a flat battery 44 for powering the electrical system of the camera 10 is provided within film container 12 in overlying relationship to rear wall 30. The rear wall 30 has openings (not shown) therein providing access to the battery terminals.

Figure 2:
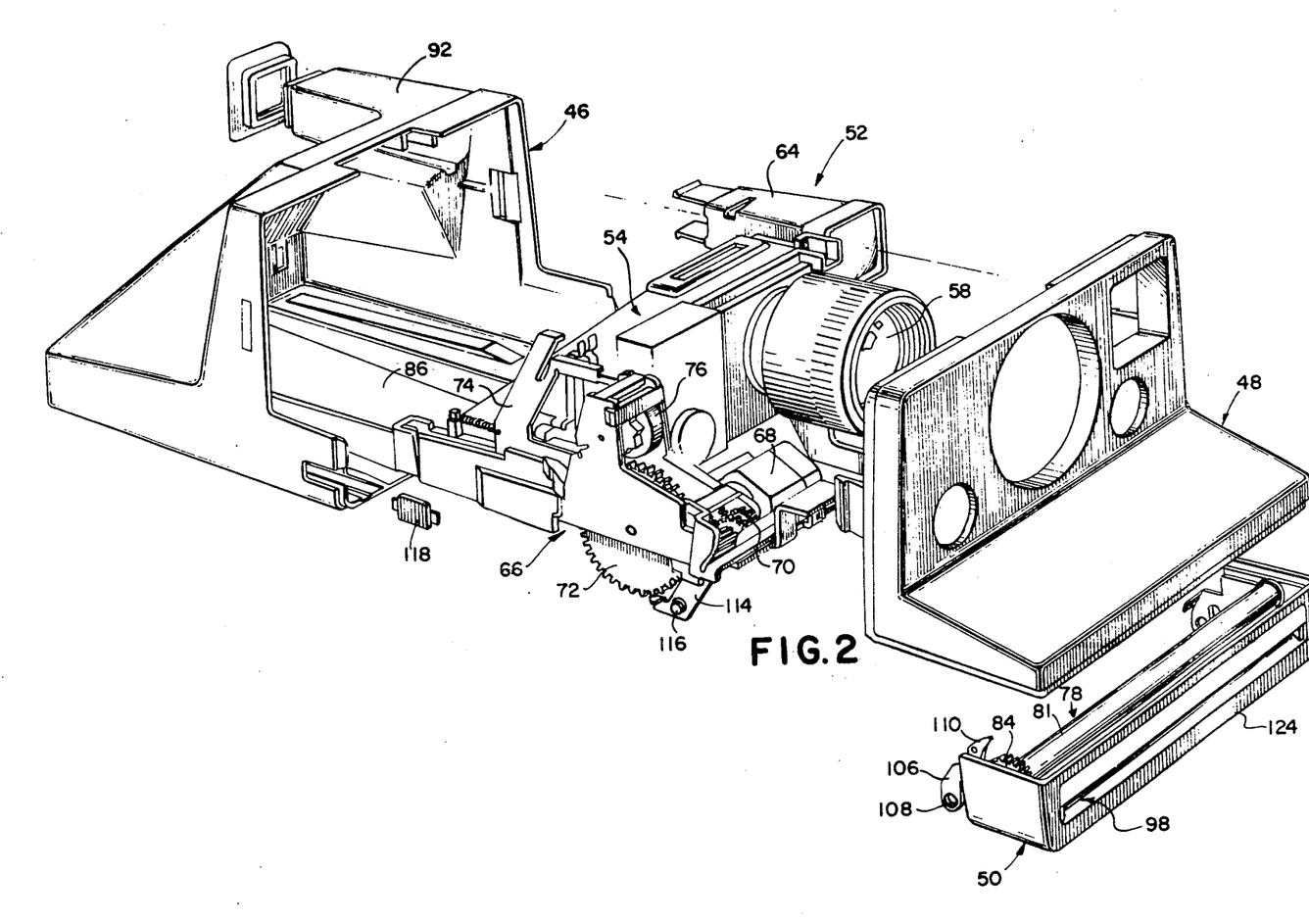
FIG. 2 is a perspective view, shown in exploded fashion, of the modular assemblies and components forming the camera shown in FIG. 1.

Camera 10 is a compact, nonfolding, modular, battery operated, self-developing camera. As best shown in FIGS. 1 and 2, it includes a housing which is formed by three molded plastic housing sections 46, 48 and 50. It is the housing section 50 with which the present invention is concerned.

The major housing section 46 is a hollow open-ended structure which is adapted to receive a major modular unit 52 mounting most of the operative components and subassemblies of the camera on a mounting frame 54.

The mounting frame 54 is a hollow, open bottomed, cone-like structure of molded plastic construction which forms the camera exposure chamber 56 (see FIG. 4) and mounts an optical system including an objective lens 58, a mirror 60 (on the interior surface of an inclined rear cone wall 62) and a viewfinder assembly 64; a camera drive, sequencing, film advance and film counting assembly 66 which includes an electrical motor 68, a gear train 70, a sequencing gear 72, a film advance device 74 and a film counter 76; and pressure-applying assembly 78 to which housing section 50 is attached and includes a mounting bracket 100 and a pair of juxtaposed pressure-applying members or rollers 81 and 82 and a roller drive gear 84 on the end of roller 81.

Figures 5, 10:
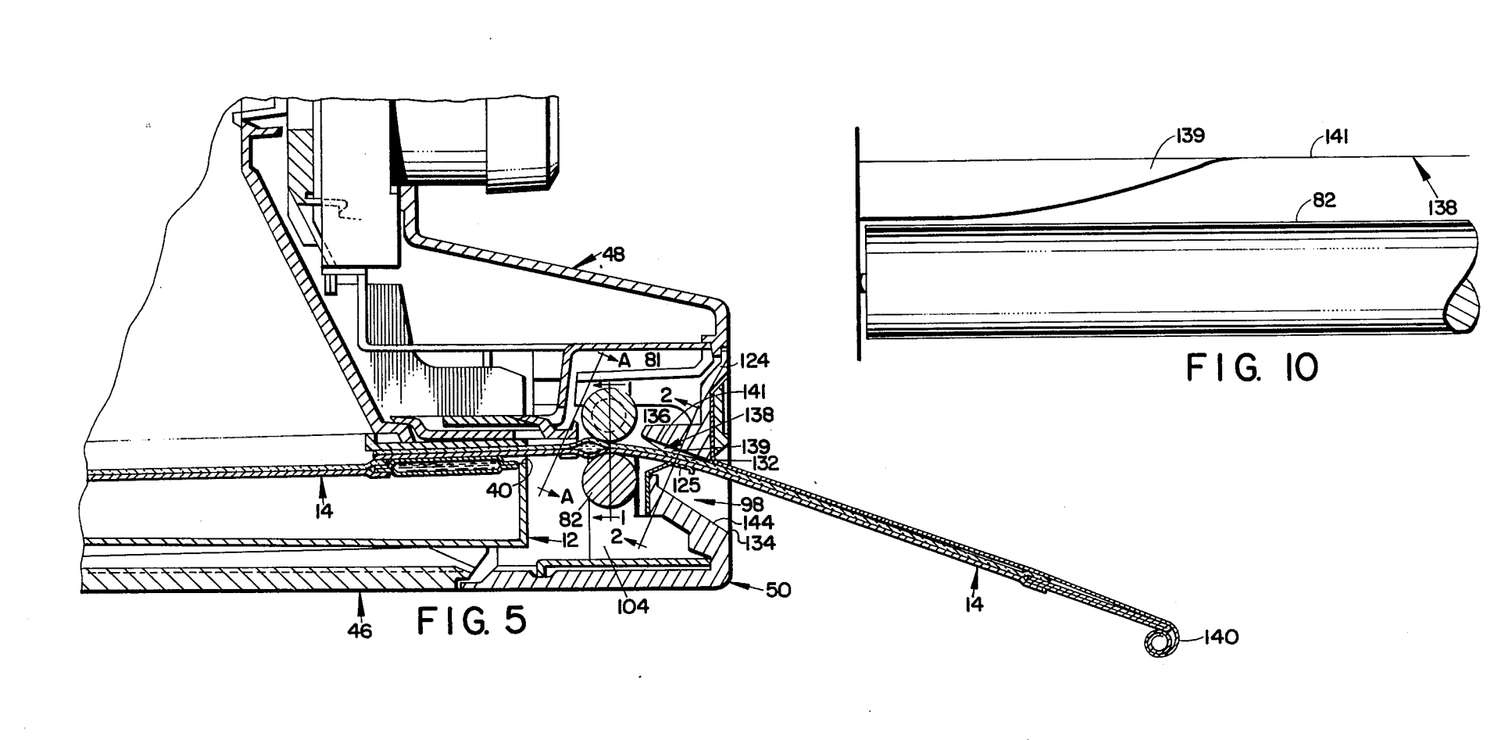
FIG. 5 is a side elevational view, partly in section, of a portion of the camera shown in FIG. 4 illustrating the path of travel of a film unit as it emerges from a pair of pressure-applying members and advances through an exit opening in the front of the camera.
FIG. 10 is a view taken along line A A of FIG. 5 without the top roller present.

When the camera 10 is assembled, the cone-like frame 54 cooperates with the bottom wall 86 of housing section 46 to define an open ended chamber 88 in the base of housing section 46 for receiving the film container 12 in the position shown in FIG. 5 with the film container exposure aperture 38 facing the open bottom of cone-like frame 54. As will be described later, roller mounting bracket 80 is pivotally mounted on frame 54 so that the roller assembly 78 and housing section 50 pivot downwardly to provide access to the open end of receiving chamber 88 for inserting and withdrawing film container 12. A pair of battery contacts 90, mounted on bottom wall 86, connect the battery 44 to the camera's electrical system.

In operation, the user views and frames the scene to be photographed through the direct viewing viewfinder assembly 64 (enclosed by a viewfinder housing 92 integrally molded with housing section 46) and focuses lens 58. A cycle of operation is initiated by depressing a camera start button 94 on housing section 48 which causes motor 68 to be energized thereby driving gear train 70 which in turn drives sequencing gear 72 and roller gear 84. Sequencing gear 72 operates a mechanism (not shown) which unlatches a normally closed electronic shutter and latches power onto an electronic logic and power circuit (neither of which is shown). This circuit controls an automatic exposure control circuit (not shown) which includes a photocell to which scene light is directed by a window 96 on housing section 48. When power is latched on, motor 68 is deenergized.

Image-bearing light from the scene is transmitted by lens 58 to cross chamber 56 where it impinges upon the mirror 60. From mirror 60, the light is reflected downwardly through the exposure aperture 38 in film container 12 to expose the forwardmost film unit 14. Using well known light integrating techniques, the exposure control circuit provides an exposure termination signal to the logic circuit which in turn provides appropriate signals to cause the electronic shutter to close and motor 68 to be reenergized.

Sequencing gear 72 drives the film advance device 74 forwardly along a linear path and a hook-like member 73 (See FIG. 4) at the trailing end thereof extending through film container access opening 42 engages the trailing end of the exposed forwardmost film unit 14 and advances it forwardly through film withdrawal slot 36 into the bite formed between the rollers 81 and 82. Roller 81 is driven at a speed of 300 RPM in a direction to cause the film unit to be advanced therebetween for progressively applying a compressive pressure along the length of the film unit 14. As will be described hereinafter, the film unit exits from camera 10 through a film exit opening 98 in housing section 50. At the termination of the processing cycle, the operating mechanisms are rest for the next cycle of operation and the cycle is automatically terminated. Thus the camera 10 exposes, transports, and processes the film units in consecutive fashion.

Figure 6:
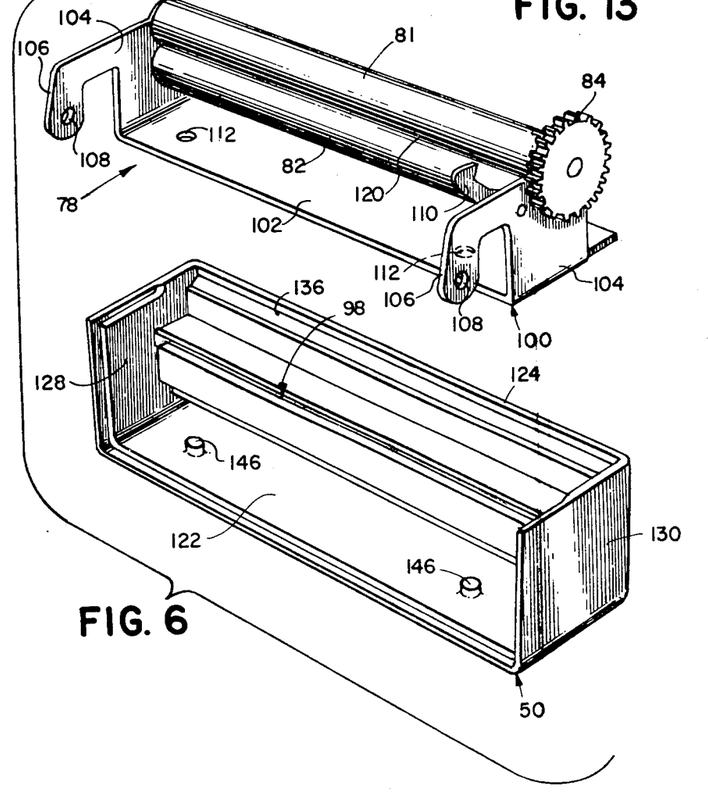
FIG. 6 is a perspective view, shown, in exploded fashion, of a molded plastic housing section embodying the present invention and a pressure-applying roller assembly that is adapted to be mounted with the housing section.

As best shown in FIG. 6, the roller assembly 78 comprises the roller mounting bracket 100 and the juxtaposed pair of pressure applying members of rollers 81 and 82 mounted thereon. In the preferred embodiment, the rollers are 0.244 inches in diameter; the top roller 81 having a thin coating of urethane thereon.

Roller mounting bracket 100 is preferably of stamped metal construction and includes a generally planar, horizontal bottom member 102, and a pair of integrally formed lateral side members 104, upstanding vertically at the lateral ends of bottom member 102. Integrally formed with side members 104 and extending rearwardly therefrom are a pair of arcuate mounting flanges 106 having mounting holes 108 therein. Other structural features of the bracket 100 include an upstanding latch member 110 integrally formed with the right hand mounting flange 106 (as viewed in FIG. 6) and a pair of locating or positioning holes 112 in horizontal member 102 for locating or positioning housing section 50 with respect to the bracket 100.

The pressure-applying members or rollers 81 and 82 are rotatably mounted between the side members 104 with their respective lateral ends mounted in suitable bearings (not shown) in lateral side walls 104. The roller drive gear 84 is mounted on the right hand end of roller 81.

As best shown in FIG. 2, the component mounting frame 54 includes a pair of laterally spaced depending legs 114 having outwardly extended pins 116 thereon which are adapted to extend through the openings 108 on bracket mounting flanges 106 thereby pivotally mounting the roller assembly on the leading end of frame 54 for pivotal movement between its positions blocking and unblocking the open end of camera receiving chamber 88. When the roller assembly is in its closed position, the latch member 110 cooperates with a slidable latch member 118 on the right hand side of housing section 46 to maintain the roller assembly in the closed position wherein the entrance side 120 (the horizontal bite between rollers 81 and 82) of the pressure-applying members is adjacent the film withdrawal slot 40 of the film container 12 and the leading end of the forwardmost film unit 14 located therein.

As noted earlier, housing section 50 is of molded plastic construction and includes generally molded and substantially mutually perpendicular wall portions 122, 124, 126, and 128. Wall portion 122 is adapted to underlie the horizontal member 102 of bracket 100 forms a horizontal extension of the bottom wall 86 of housing section 46 when the roller assembly is located in the closed position. The forward wall portion 124 includes the film exit slot 98 integrally molded therein and serves as a leading end wall of the camera housing.

The lateral sides of housing section 50 asre formed by lateral side wall portions 128 and 130.

The integrally molded film exit slot 98 in wall portion 124 is transversely disposed therein and is just slightly wider than the lateral dimension of the film unit 14. On the exterior surfaces of wall portion 124 the vertical dimension of the slot 98 is established by upper and lower horizontal edges 132 and 134 respectively.

Figure 4:
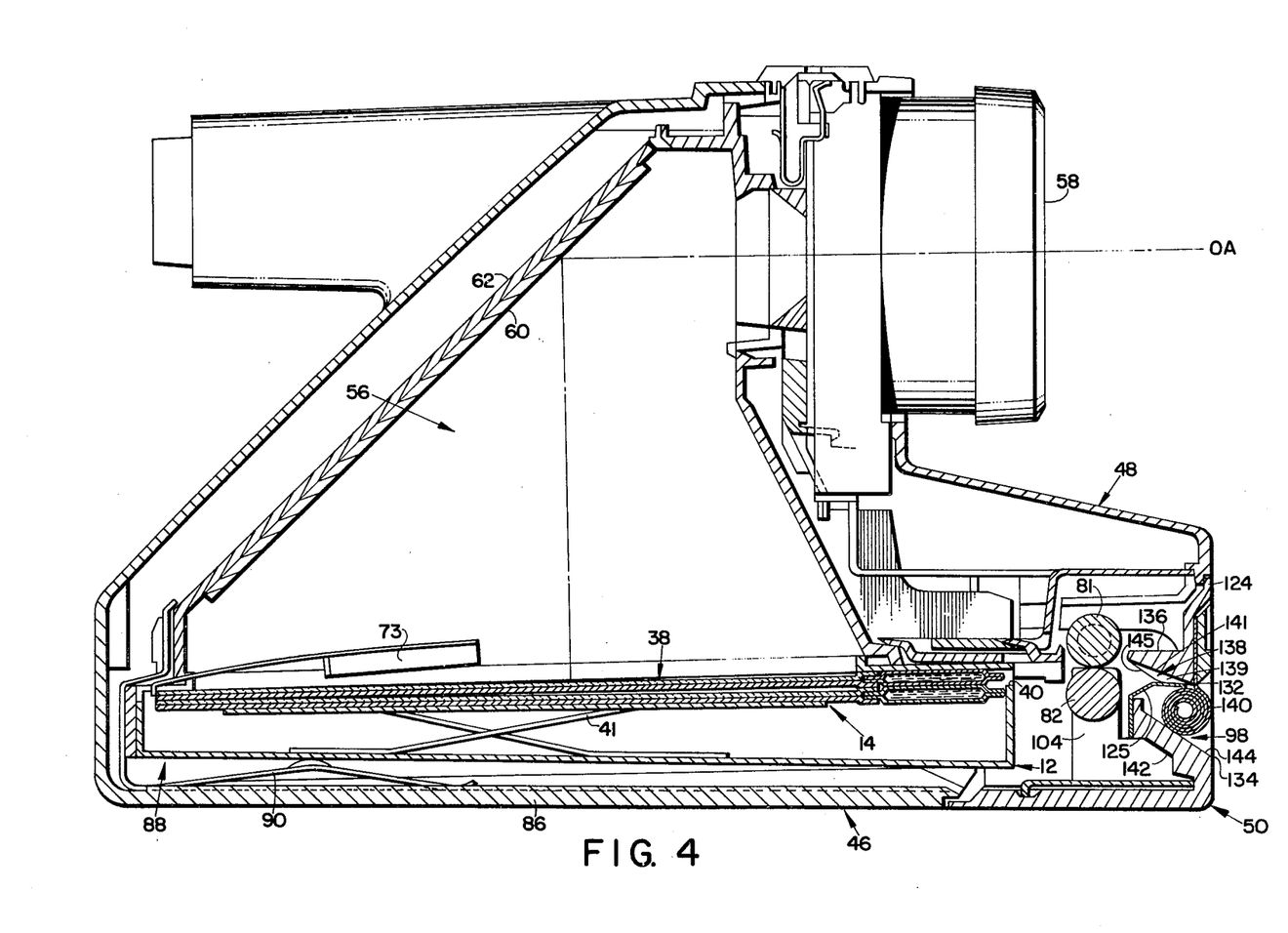
FIG. 4 is a side elevational view, partly in section, of the camera shown in FIG. 1.

According to the present invention and as shown in FIGS. 4, 5 and 9, the housing section 50 further includes a camming member 136 integrally molded with wall portion 124 and extending rearwardly therefrom to define an inclined transversely contoured camming surface 138 which is preferably coextensive with the width of slot 98 and extends rearwardly from the upper edge 132 of slot 98 and upwardly therefrom towards the exit side of the rollers 81 and 82 (opposite entrance side 120). As will be described later, camming surface 138 serves as means for intercepting the leading edge of a film unit 14 as it emerges from the bite or gap between the rollers, 81 and 82, to bend the film unit downwardly toward the exit slot 98 and simultaneously bend it transversely so as to produce a complex curvature to the film unit for purposes of influencing the thickness of the fluid 22 as it is progressively spread lengthwise across the film unit 14 from its leading to its trailing edge.

The previously mentioned copending applications Ser. Nos. 466,371 and 466,414 disclose an extensible and retractible light shield for shielding that portion of the film unit 14 that extends exteriorly of exit slot 98 before the trailing end of the film unit 14 passes between rollers. Although the processing fluid 22 includes an opacification system which allows the film unit to be ejected into the ambient light without causing further exposure of the photosensitive material within the film unit, it is desirable to light shield the exterior portion of the film unit to prevent "light-piping" or transmission of light lengthwise within the transparent outer sheet which may travel rearwardly to a point aft of the rollers 81 and 82 and expose or fog that portion of the film unit that has not yet been protected by the processing fluid. This concept is fully explained in the aforementioned U.S. Pat. No. 3,810,211.

The light shield is preferably in the form of a coil 140 of resilient, light opaque material, such as treated Mylar, which has its exterior end attached to wall portion 124 above upper edge 132 of slot 98. The coil 140 is normally retracted and is positioned in alignment with and in substantially light blocking relation to slot 98 (see FIG. 4).

In order to accurately locate coil 140 in its proper retracted position, housing section 50 further includes a rearwardly extending member 142 integrally molded with wall portion 124 that defines an upwardly inclined surface 144 on the opposite side of slot 98 from camming surface 138 extending rearwardly and upwardly from lower edge 134 of slot 98 toward the exit side of the rollers. Surface 144 serves as a locating stop against which the retracted coil 140 bears and is preferably coextensive with the width of slot 98 so as to cooperate with the retracted coil or shield 140 to form a light seal for film exit slot 98. This seal is necessary to prevent light from being transmitted through slot 98 and the bite of the rollers which may cause fogging of the forwardmost film unit 14 in container 12.

Housing section 50 further includes integrally molded means for accurately positioning it, and especially the exit slot 98 and the camming surface 138, with respect to the bite between pressure applying rollers 81 and 82. As best shown in FIG. 6, the horizontal wall portion 122 of housing section 50 has integrally molded therewith a pair of projections or pins 146 which extend upwardly and vertically from the interior surface thereof. The pins 146 extend through the locating holes 112 in the mounting bracket member 102 and the interior surface of wall portion 122 bears on the underside surface of member 102 to stabilize and accurately position housing section 50 with respect to the rollers 81 and 82. So positioned, the housing section 50 is attached to bracket 100 by any suitable means such as screws, rivets, etc. (not shown). While the positioning structure (pins 146 and the interior surface of wall portion 122) have been shown to be integrally formed with wall portion 122, it is within the scope of the present invention to provide cooperating positioning and locating structure on the wall portions 128 and 130 and the bracket lateral members 104.

With roller mounting bracket 100 and housing section 50 located in the closed position (see FIGS. 4 and 5) the leading end wall portion 124 is disposed forwardly of the exit side of the rollers 81 and 82, a distance less than the given length of a self-developing film unit so that a major portion of the film unit 14 will extend outside of the camera 10 when the trailing edge of the film unit clears the bite between the rollers, 81 and 82. In this connection, a pair of spaced apart resilient film retainers 125 are provided positioned adjacent and opposite the transverse sides attached to the section 142, for the purpose of releasably holding the film unit 14 against the camming surface 138 so that it may be conveniently removed by the user.

As was noted earlier, the film unit 14 has an inherent stiffness thereto since the outer support sheets are preferably formed of a material such as Mylar or conventional film base material. As the film unit is advanced through the rollers 81 and 82 it tends to follow a natural or normal emerging path of travel, defined by the inherent stiffness, that tends to be substantially parallel to the horizontal wall portion 122 of housing section 50.

When housing section 50 is accurately positioned on bracket 100, the film exit slot 98 is offset from the normal emerging path of travel. However, the rearwardly extending and upwardly inclined camming surface 138 intersects with and extends through the emerging path of travel.

In operation, the camera cycle is initiated, the forwardmost film unit is exposed and the exposed film unit is advanced leading end first, into the bite formed between the rollers 81 and 82 from the film entrance side 120 thereof. The driven top roller 81 causes the film unit to be advanced therebetween and the emerging leading end is engaged by the inclined camming surface 138 thereby deflecting the film unit downwardly and guiding it toward exit slot 98. This deflection induces a complex bend or curvature in the film unit, forwardly of rollers 81 and 82, which as previously mentioned provides a beneficial influence on the uniformity of the distribution of the processing fluid that is spread between the predetermined layers of the film unit 14.

Figure 11:
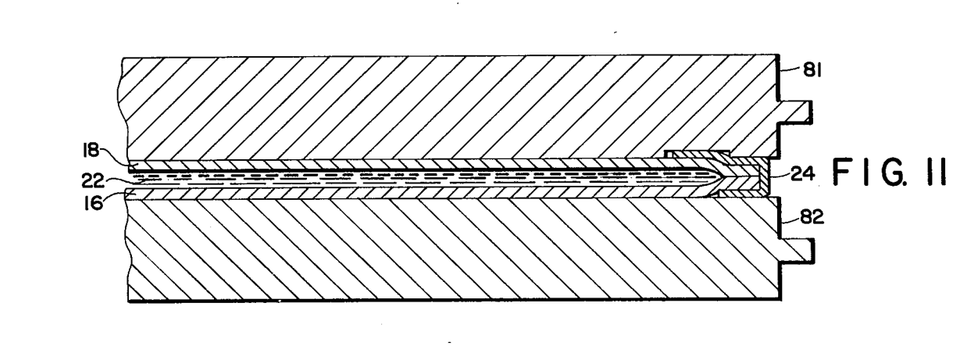
FIG. 11 is a section taken along line 1—1 of FIG. 5.

To understand the nature of the curvature and its effect on the thickness of the processing fluid 22, the slope of the surface 138 will be examined with referenced to FIGS. 5, 9, and 11.

A number of sections are taken in FIG. 5 to illustrate both the transverse shape of the surface 138 and the changes in the cross-sectional shape of the film unit as it proceeds from a station between the rollers, 81 and 82, (Section 1—1, FIG. 11) to a station along the surface 138 taken along Section 2—2, FIG. 9. Notice in FIG. 11 that the thickness of the processing fluid 22 between the sheet elements 16 and 18, is substantially uniform. However, if this is contrasted with Section 2—2, FIG. 9, it can be seen that the film unit now has a transverse bend in it while it is obviously also bent downwardly toward the exit slot 98. The combined effect of these two bends shows up as a reduction in thickness not only at the central part of the film unit, but, as can be seen in FIG. 9, also at is lateral edges. The effect of the contoured surface 138 can be thought of as a change in the "effective gap" between the rollers, 81 and 82. In other words, the thickness of the fluid is controlled, ultimately, not by the rollers, but by the combination of the camming surface 138 which is located forward of the rollers and the rollers.

Figure 12:
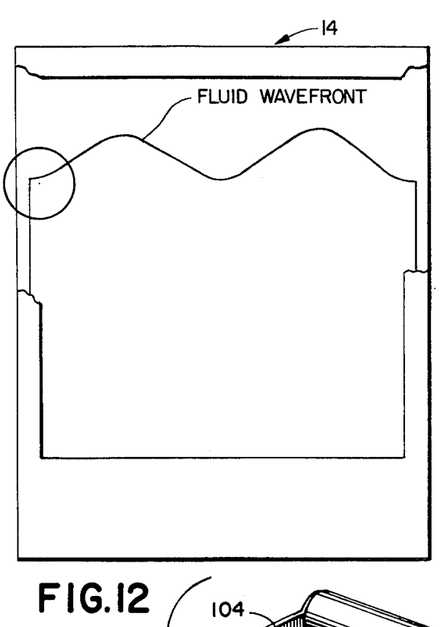
FIGS. 12 and 13 are top views of the film unit of FIG. 7, with parts broken away, illustrating fluid flow patterns with and without the invention.
Figure 13:
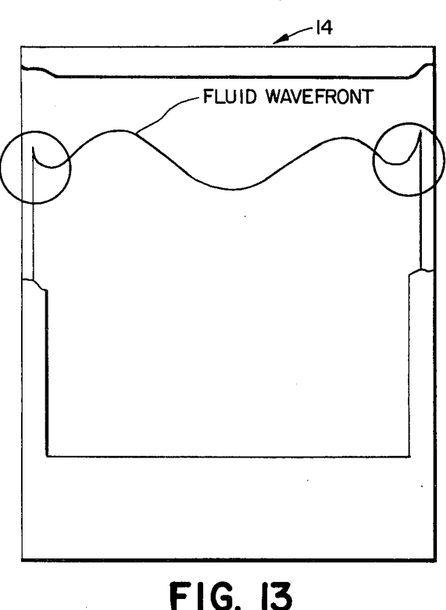

The effect that the camming surface 138 has on the distribution of the processing fluid is best seen by comparing the flow patterns shown in FIGS. 12 and 13. FIG. 12 illustrates the flow pattern with a flat camming surface and FIG. 13 is the flow pattern achieved with the transversely contoured surface of the invention. In both figures, the binding element 24 has been partially broken away and the spreading process stopped prior to reaching the trailing edge. By doing this, it is possible to examine the flow along the lateral edges and compare the differences. Notice the circled areas along the lateral edges on both Figures. FIG. 13 clearly indicates that the fluid 22 is farther advanced toward the trailing edge of the film than would be the case without the use of the invention. This indicates that the fluid is being spread in a thinner layer along the lateral edges; this is exactly the result necessary in order to assure that no incomplete corners will result.

The contour of the surface 138 is achieved by integrally molding apair of transversely spaced apart specially shaped protrusions 139 or bumps, one profile of which is shown in FIG. 4 and the other shown in FIG. 10 which is a view of the surface 138 looking parallel to a flat central portion 141 and over the top of the roller 82 (with roller 81 removed), i.e., along Line A—A in FIG. 5. FIG. 10 the tranverse profile the film unit "sees," and therefore tends to conform to, while it is being advanced to the exterior of the camera.

The surface 138 should be polished to reduce friction, and referring to FIG. 9, it is important that the width of the film retainers 125 do not extend inwardly so far that they begin to pinch the sheet elements 16 and 18, together. In this connection they ought to remain on the relatively flat portion of the bumps 139 as shown in FIG. 9. A finish that has been found effective is a No. 1 finish per the Society of Plastic Industry and Engineering Mold finish comparison kit.

It is important, if the protrusions 139 are to be effective in transversely bending the film unit, that they extend into or interfere with the path a film unit would take with just a flat camming member, i.e., without the protrusions present. In selecting the height of the protrusions, it is therefore necessary to establish what the path would be. Obviously, the more the protrusions project into that path, the more transverse bending influence they will have.

Figure 14:
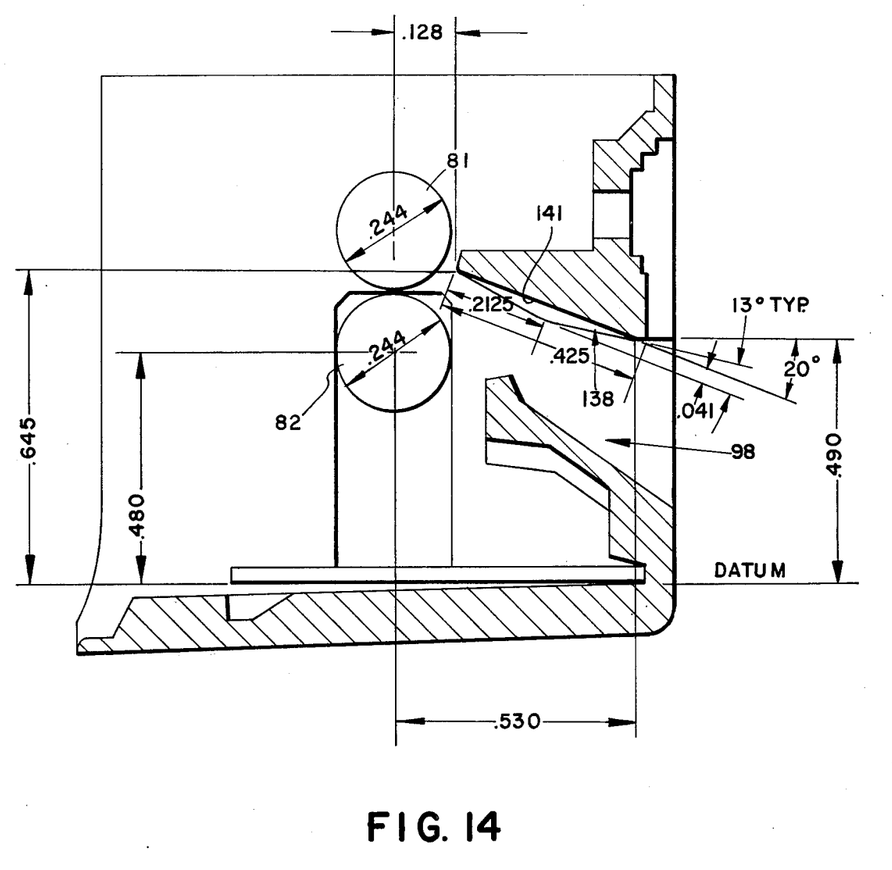
FIG. 14 is a side elevational view of the preferred embodiment illustrating certain of its dimensions.

Certain dimensions have been indicated in the various figures and in particular in FIG. 14 in order to impart a full understanding of the present invention, the geometry of the preferred embodiment, and the attendant advantages thereto. However, it is to be expressly understood that these dimensions are exemplary only and are not to be interpreted as restricting the scope of the present invention in any manner.

It should be recognized that an important aspect of the geometry is that the size and location of the protrusions 139 and the other geometry must be selected, that the protrusions 139 influence the thickness of the fluid being spread over the photoexposed area of the film unit as soon as possible after the container 20 is ruptured.

Another aspect of the shape of the protrusions 139 has to do with how they can be used to line up the trailing edge of a film unit retained by the camera with the leading edge of a next advancing film unit so that, if the user doesn't remove a processed film unit, the next advancing film unit will push the retained one out of the camera. This is done by having a rear portion 145 taper from the high point of the protrusion 139 rearwardly so that it terminates substantially in line with the normal path of travel of an emerging film unit. This configuration of portion 145 induces a transverse bow to the trailing edge of the film unit after it emerges from between the rollers, 81 and 82, so that a next advancing film unit may more easily contact the prior advanced film unit to push it out of the camera 10.

It is also important that the protrusions be shaped to provide contours that will produce smooth transitions in the bending of the film unit. It is apparent that sharp edges that would result in abrupt changes are not desirable.

As the leading end of the film unit proceeds towards exit 98, it engages the coil 140 and drives or extends it forwardly such that it progressively unfurls in overlying relation to the top transparent outer support sheet of the film unit. The length of coil 140 is shorter than the length of film unit 14 that extends out of slot 98 before the trailing end of the film unit 14 passes between rollers 81 and 82. Just before the film unit is disengaged from rollers 81 and 82, the free end of the coil becomes disengaged from the leading end of the film unit 14 and automatically snaps back to its retracted position. The film unit is releasably retained on housing section 50 by the film retainers 125 until it is removed at the convenience of the user or pushed out by a subsequently advancing film unit.

In summary, a self-developing camera has been provided which includes a novel housing section of molded plastic construction having integrally molded therewith a film exit slot, a film camming or bending member and means cooperating with a roller mounting bracket for accurately positioning the housing section with respect to a pair of pressure applying rollers. In a preferred embodiment, the housing section also includes an integrally molded member serving as a stop for an extensible and retractable light shield and cooperating with the light shield to form a light seal for the exit slot.

Since certain changes may be made in the above camera without departing from the scope of the invention herein involved, it is intended that all matter contained in the above description or shown in the accompanying drawings shall be interpreted as illustrative and not in a limiting sense.

What is claimed is:

1. Photographic apparatus comprising:
    means for spreading a mass of fluid in a substantially thin layer between a pair of sheet materials, said fluid spreading means including a pair of elongated juxtaposed pressure-applying members between which the sheet materials may be advanced in superposed relationship; and
    means for reducing the thickness of the layer of fluid spread between the superposed sheet materials by said fluid spreading means in the vicinity of both opposed longitudinal edges of the superposed sheet materials relative to the thickness of the layer of the fluid spread between the superposed sheet materials by said fluid spreading means adjacent their longitudinal center portions, said fluid thickness reducing means being positioned to engage the leading transverse edges of the superposed sheet materials as they emerge from between said pressure-applying members while a major portion of the sheet materials still remain on the opposite side of said pressure-applying members from said fluid thickness reducing means.

2. The photographic apparatus of claim 1 wherein said fluid thickness reducing means are structured to impart a transverse bow to the portions of the superposed sheet materials advancing therepast.

3. The photographic apparatus of claim 2 wherein said fluid thickness reducing means includes a pair of members spaced apart to engage opposed longitudinal edge portions of the superposed sheet materials to deflect their opposed longitudinal edge portions from the path they would otherwise follow as they emerge from between said pressure-applying members.

4. The photographic apparatus of claim 2 wherein said fluid thickness reducing means additionally includes means for restraining the longitudinal center portion of the superposed sheet materials as their opposed longitudinal edge portions are deflected by said spaced apart members to assure that their opposed longitudinal edge portions do not slide inwardly away from said spaced apart members.

5. The photographic apparatus of claim 3 wherein each of said spaced apart members includes a high point and a pair of ramp surfaces extending away from said high point in opposite directions along the general path of travel of the film unit through said apparatus, said spaced apart members being arranged so that initial contact between the superposed sheet materials and said spaced apart members occurs at a preselected location on said pair of ramped surfaces extending intermediate said high points of said spaced apart members and said pressure-applying members.

6. The photographic apparatus of claim 5 wherein said spaced apart members are located so that portions of the superposed sheet materials rest against said high points of said spaced apart members prior to the time any photoexposed portion of the superposed sheet materials has emerged from between said pressure-applying members.

7. Photographic apparatus comprising:
    means for receiving and locating a resiliently flexible self-processable film unit in position for exposure, the film unit including a container of processing fluid mounted adjacent a leading transverse edge thereof;

a pair of elongated juxtaposed pressure-applying members between which the film unit may be advanced leading transverse edge first, said pressure-applying members serving to effect first the release of the fluid from the film unit's container and then the spreading of the released fluid in a layer progressively lengthwise across preselected portions of the film unit as it is advanced lengthwise between said pressure-applying members; and interceptor means, positioned to engage the leading transverse edge of the film unit as it emerges from between said pressure-applying members while a major lengthwise portion of the film unit is still disposed on the other side of said pressure applying members, for reducing the thickness of the entire layer of fluid which would otherwise be spread across the preselected portions of the film unit absent said interceptor means and for further reducing the thickness of the layer of fluid spread in the vicinity of both opposed longitudinal edges of the film unit relative to the thickness of the layer of fluid spread adjacent the longitudinal center portion of the film unit absent said interceptor means.

8. The photographic apparatus of claim 7 wherein said interceptor means are structured to impart a transverse bow to the portions of the film unit advancing therepast.

9. The photographic apparatus of claim 8 wherein said interceptor means includes a pair of members spaced apart to engage opposed longitudinal edge portions of the film unit to deflect its opposed longitudinal edge portions from the path they would otherwise follow absent said interceptor means as they emerge from between said pressure-applying members.

10. The photographic apparatus of claim 9 wherein said interceptor means additionally comprises an elongated support extending lengthwise of said pressure-applying members and wherein said pair of spaced apart members extend from said support.

11. The photographic apparatus of claim 10 wherein said support includes a surface positioned to restrain the bowing movement of the film unit under the influence of said spaced apart members.

12. The photographic apparatus of claim 11 wherein said restraining surface is canted with respect to the normal path of travel of the film unit as it emerges from between said pressure-applying members absent said interceptor means.

13. The photographic apparatus of claim 12 wherein said restraining surface is substantially flat.

14. The photographic apparatus of claim 12 wherein said spaced apart members and said restraining surface are formed on a unitary plastic member.

15. The photographic apparatus of claim 9 additionally including means for defining an elongated film exit and for releasably gripping the film unit when a portion thereof is disposed in said exit, said exit being offset with respect to the path of travel that the leading transverse edge of the film unit would normally follow as it emerges from between said pressure-applying members absent said interceptor means, said exit further being positioned so that a major portion of the film unit extending therethrough and outside of said apparatus when the trailing edge of the film unit emerges from between said pressure-applying members, and wherein said interceptor means is structured to direct the leading transverse edge of the film unit as it emerges from between said pressure-applying means through said exit, said spaced apart members being structured to prevent the trailing edge of the film unit when it leaves said gap from flipping out of said normal path of travel under the influence of its resiliently flexible characteristic so that the leading edge of the next film unit advancing through said gap will engage the trailing edge of the first memtioned film unit to push it entirely outside of said apparatus.

16. The photographic apparatus of claim 15 wherein each of said spaced apart members includes a high point and a pair of ramped surfaces extending away from said high point in opposite directions along the general path of travel of the film unit through said apparatus.

17. The photographic apparatus of claim 9 wherein said interceptor means additionally includes a support for restraining the bowing movement of the film unit under the influence of said spaced apart members.

18. The photographic apparatus of claim 16 wherein said spaced apart members are structured and positioned so that their said high points and their said ramps function to impart a transverse bow in portions of said film unit intermediate said interceptor means and said pressure-applying members.

19. The photographic apparatus of claim 9 wherein each of said spaced apart members include a high point and a pair of ramped surfaces extending away from said high point in opposite directions along the general path of travel of the film unit through said apparatus, said spaced apart members being arranged so that initial contact between the film unit and said spaced apart members occurs at a preselected location on said pair of ramped surfaces extending intermediate said high points and said pressure-applying means and so that portions of the film unit rest against said high points of said spaced apart members prior to the time any photo-exposed portion of the film unit has emerged from between said pressure-applying members.

20. The photographic apparatus of claim 16 wherein said pair of spaced apart members are structured and positioned so that said ramped surfaces extending intermediate said pair of high points and said pressure-applying members serve to prevent the trailing edge of the film unit from flipping out of said normal path under the influence of its resiliently flexible characteristic.

* * * * *